United States Patent [19]

James

[11] Patent Number: 4,479,993

[45] Date of Patent: Oct. 30, 1984

[54] PATIENT SUPPORT MEANS

[75] Inventor: David R. James, Glendyard, Tirley, England

[73] Assignee: James Industries Ltd., Gloucester, England

[21] Appl. No.: 434,237

[22] Filed: Oct. 14, 1982

[30] Foreign Application Priority Data

Oct. 16, 1981 [GB] United Kingdom ................. 8131349

[51] Int. Cl.[3] .............................................. B32B 23/02

[52] U.S. Cl. ......................................... 428/193; 5/61; 428/192; 428/253; 428/255

[58] Field of Search ............... 428/192, 193, 253, 255; 5/61

[56] References Cited

U.S. PATENT DOCUMENTS 3,133,852 5/1964 Crane et al. ......................... 428/222

3,185,612 5/1965 Durham .............................. 428/193

3,316,117 4/1967 Clifford et al. ...................... 428/193

4,270,234 6/1981 James ........................................ 5/61

*Primary Examiner*—James J. Bell

*Attorney, Agent, or Firm*—Collard, Roe & Galgano

[57] ABSTRACT

Patient support means comprise a net for use with a net bed having rotary shafts on to which the ends of the net are wound, so that in use the patient is supported on the net which is slung between the shafts. The net is of knitted form and manufactured from a heat-settable thermoplastics material which is heat set to provide satisfactory memory such that it does not take a substantially permanent set under normal patient loading. The knitted material of the net has a lengthwise extensibility of between 17% and 35%, a widthwise extensibility of between 4% and 12% and a ratio of lengthwise to widthwise extensibilities of between 3 and 6.

12 Claims, 2 Drawing Figures

PATIENT SUPPORT MEANS

BACKGROUND OF THE INVENTION

1. Field of the Invention

This invention relates to patient support means for use with beds of the type in which the patient is supported on a flexible web of mesh or net form. A bed of this type is hereinafter referred to generally as a "net bed", and the web thereof as "the net".

2. Description of the Prior Art

The net may be slung between two shafts on to which the ends of the net are respectively wound, and such net beds which are in general use are disclosed in U.S. Pat. No. 4,270,234 provide major advantages in the handling of patients. The net-supporting shafts of the bed can be turned in the same direction to transfer the net from one shaft to the other, whereby the patient on the net is turned and repositioned thereon, or the shafts can be turned in opposite directions to raise or lower the patient with respect to a conventional mattress or other support surface below the net. Net beds in general are also particularly valuable in the prevention and treatment of bed sores as the net conforms to the shape of the patient who is thus supported with a substantially uniform pressure thereby eliminating high pressure loading of specific areas of the body and the mesh provides excellent ventilation of the skin.

It will be appreciated from the foregoing that the material and construction of the net, and the mesh size thereof, must be such as to allow the net to conform to the shape of the patient, thereby spreading the load and avoiding localized high pressure areas, and also to allow adequate ventilation. However, the mesh apertures are desirably small enough to avoid the fingers of a patient being trapped therein.

The nets at present in use, designed to satisfy these requirements, suffer from a number of disadvantages. A first disadvantage is that conforming of the net to the body shape of a patient results in excessive shortening of the net between the shafts, when such are employed, with the result that the effective length of the net available to support the patient is considerably reduced. Another disadvantage is that the nets tend to creep along the supporting shafts which, although in general more-or-less parallel, are often slightly inclined so as to have a narrower spacing at the foot end to facilitate simultaneous turning at that end by the two hands of a nurse. This shaft inclination increases the creepage problem. A further disadvantage with net beds generally is that after use the nets tend to retain the sag produced when supporting the patient and thus they do not readily, if at all, return to the original unstretched condition.

SUMMARY OF THE INVENTION

The principle object of the invention is to provide a net with characteristics which materially overcome or substantially lessen the foregoing problems. In particular it has been found that not only are the lengthwise and widthwise extensibilities of the net important, but also the ratio of these two parameters.

According to the invention patient support means comprise a net, in or for a net bed, with a lengthwise extensibility of between 17% and 35%, a widthwise extensibility of between 4% and 12% and a ratio of lengthwise to widthwise extensibilities of between 3 and 6, the net being manufactured from a heat-settable thermoplastics material which is heat set to provide satisfactory "memory" such that it does not take a substantially permanent set under normal patient loading.

The extensibility of a material, as that term is used herein and in the appended claims, is to be that as measured under a 3 kg longitudinal loading of a piece of the material concerned measuring 7.62 cm (5 ins) in width and 20.32 cm (8 ins) in length.

Preferably the lengthwise extensibility lies within the range of 22% to 30%, the widthwise extensibility lies within the range of 5% to 10%, and said ratio thereof lies between 3 and 6. Desirably the ratio of lengthwise to widthwise extensibilities lies between 4 and 5.

The thermoplastics material used and the net formation used should be such that the net is launderable by normal hospital procedures and will still retain characteristics within the specification set. Preferably it is a knitted polyester fabric manufactured from 167 D/tex flat mono-filament polyester yarn. The knitted mesh preferably has a hole size with a lengthwise dimension of between 8 mm and 11 mm and a widthwise dimension of between 7 mm and 9 mm, the terms "length" and "width" being used herein with reference to the fitted bed condition, i.e. in use the patient lying extending in the lengthwise direction of the net. Thus, the complete net will normally be of greater width than length, to allow for the portions wound on to supporting shafts.

Other features of the invention will be apparent from the following description, drawings and claims, the scope of the invention not being limited to the drawings themselves as the drawings are only for the purpose of illustrating one way in which the principles of the invention can be applied. Other embodiments of the invention utilizing the same or equivalent principles may be used and structural changes may be made by those skilled in the art without departing from the present invention and the purview of the appended claims.

BRIEF DESCRIPTION OF THE INVENTION

DESCRIPTION OF THE PREFERRED EMBODIMENT

Figure 1:
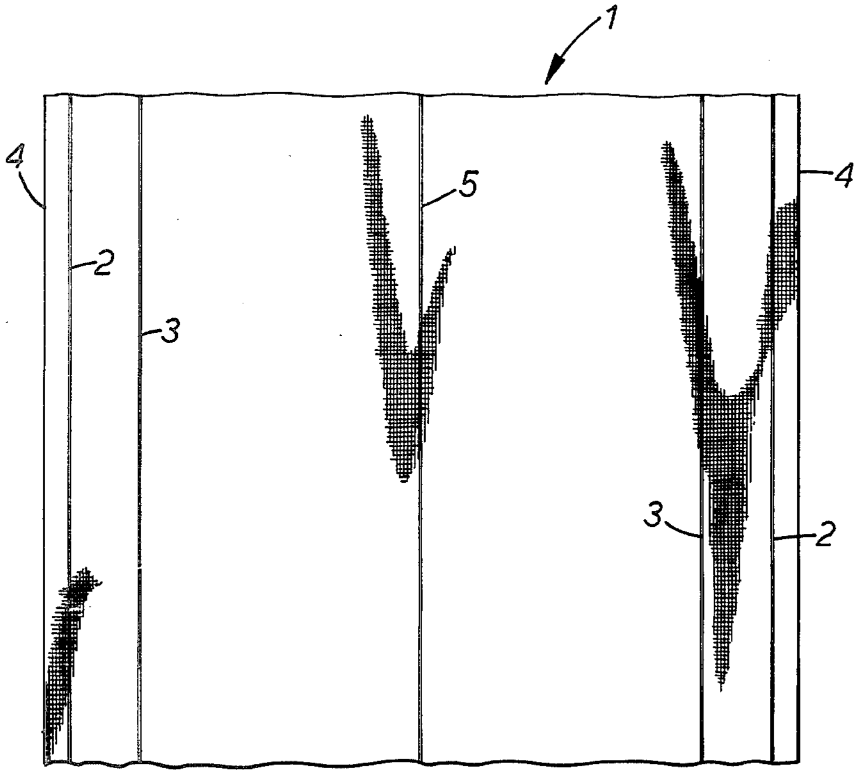
FIG. 1 is a schematic plan of a net in accordance with the invention.

The net 1 illustrated is knitted from 100% polyester flat mono-filament yarn of 167 D/tex. The net has an overall width of 30.48 cm (10 ft 0 ins) and an overall length of 25.91 cm (8 ft 6 ins). It is intended to be used slung between two rotatable net-supporting shafts of a net bed, which apart from the present net is of known form and hence is not illustrated in the drawings. For example, it may be as disclosed in said U.S. Pat. No. 4,270,234.

At each end, which is in use wound on the corresponding shaft of the net bed, the net 1 has two knitted-in red marker threads 2 and 3 respectively positioned 10.16 cm (4 ins) and 38.10 cm (15 ins) from the corresponding selvedge 4 of the net, the cut edges of the net thus defning the length dimension. Each thread 2 with the corresponding selvedge 4 defines the zone of the net which is to be hooked on to attachment hooks on the shaft to which it is fitted, and the thread 3 provides a warning that the end of the net is approaching as it is unwound from the corresponding shaft of the net bed. A central green strip 5 of 15 mm width is knitted centrally into the net 1 to indicate the center for initial setting up between the shafts of a bed.

The knitted material of the net 1 has a weight of 226 gm plus or minus 5% per square meter and a minimum burst strength of 2.46 Kgm per square cm (35 lbs per square inch). The extensibility characteristics, as that term is hereinbefore defined, are a lengthwise extensibility of between 22% and 30% and a widthwise extensibility of between 5% and 10% with an average ratio thereof in the range of 4 and 5.

Figure 2:
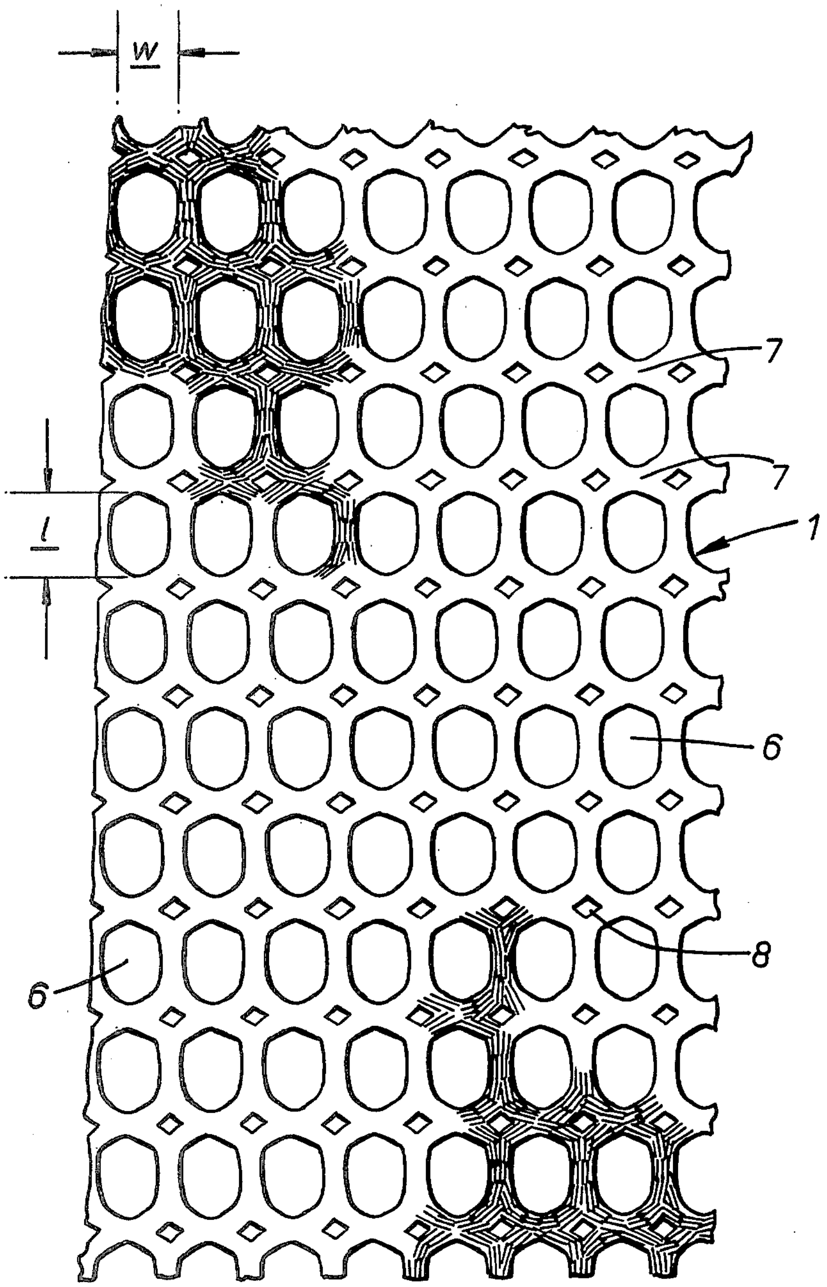
FIG. 2 is a detail full size view of the net.

Referring now to the detail view of FIG. 2, the mesh is knitted with parallel rows of holes such as 6 having a lengthwise dimension 1 of 8 mm to 11 mm and a widthwise dimension w of 7 mm to 9 mm. In the widthwise direction adjoining holes 6 are separated by lengthwise columns of inter-knitted multi-filament form with the filaments of the two columns defining a hole 6 being inter-knitted at cross-over points such as 7 to define the lengthwise ends of that hole. This results in the hole shape and construction illustrated in which the column filaments of each four adjoining holes 6 cross over to leave a small hole space 8 at the centre of each group of four adjoining holes 6.

The described net construction conforms satisfactorily to the shape of a supported patient, thereby avoiding localised high pressure zones, while the net does not sag in such manner as to provide undue narrowing of the net between the shafts. Furthermore, the hole size provides adequate skin ventilation without allowing the fingers of a patient to be trapped. The net has a good memory, and thus does not take up a permanent set under normal patient load, such as is not removed by simple manual tightening of the net between the shafts prior to re-use. The net withstands laundering many times by normal washing procedures, at temperatures below that at which the net material was heat set during manufacture, while still remaining within the required specification, and the problem of creepage along the poles of the bed which is present with prior nets is largely overcome or materially reduced. The material also has a satisfactory fire retardancy factor.

I claim:

1. Patient support means comprising a net, in or for a net bed, said net having a lengthwise extensibility of between 17% and 35% a widthwise extensibility of between 4% and 12% and a ratio of lengthwise to widthwise extensibilities of between 3 and 6, the net being manufactured from a heat-settable thermoplastics material which is heat set to provide satisfactory "memory" such that it does not take a substantially permanent set under normal patient loading.

2. Support means according to claim 1, wherein said lengthwise extensibility lies within the range of 22% to 30%.

3. Support means according to claim 1, wherein said widthwise extensibility lies within the range 5% to 10%.

4. Support means according to claim 1, wherein said ratio lies between the values of 4 and 5.

5. Support means according to claim 1, wherein the net is knitted polyester fabric.

6. Support means according to claim 5, wherein the net is manufactured from 167 D/tex flat mono-filament yarn.

7. Support means according to claim 5, wherein the knitted mesh of the net has a hole size with a lengthwise dimension of between 8 mm and 11 mm and a widthwise dimension of between 7 mm and 9 mm.

8. Support means according to claim 5, wherein the mesh of the net is knitted with parallel rows of similar holes each having a length greater than its width and separated in the widthwise direction by lengthwise columns of inter-knitted multi-filament form, the filaments of the two columns defining each hole being inter-knitted at cross-over points to define the lengthwise ends of that hole.

9. Support means according to claim 8, wherein the column filaments of each four adjoining holes of said mesh cross over to leave a small hole space at the center of each group of four adjoining holes.

10. Support means according to claim 1, wherein the net is knitted with a selvedge at each side edge so that the cut edges of the net define the lengthwise dimension thereof, the net being of greater width than length to allow for winding on to rotary shafts of the net bed.

11. Support means according to claim 10, wherein the net has two knitted-in marker threads which are respectively equally spaced from the side edges of the net, to provide in use a warning that an end of the net is approaching as it is unwound from a corresponding shaft of the net bed.

12. Support means according to claim 10, wherein the net has a central knitted-in marker thread whereby, in use of the net, to assist centering of the net between rotary supporting shafts of the net bed.

* * * * *